March 14, 1961  B. E. O'CONNOR ET AL  2,974,639
HYDRAULIC BRIDGE SERVO CONTROL SYSTEM
Filed Oct. 3, 1956  2 Sheets-Sheet 1

Inventors
BERNARD E. O'CONNOR
GORDON E. WHELPLEY
by Hill, Sherman, Meroni, Gross & Simpson Attys.

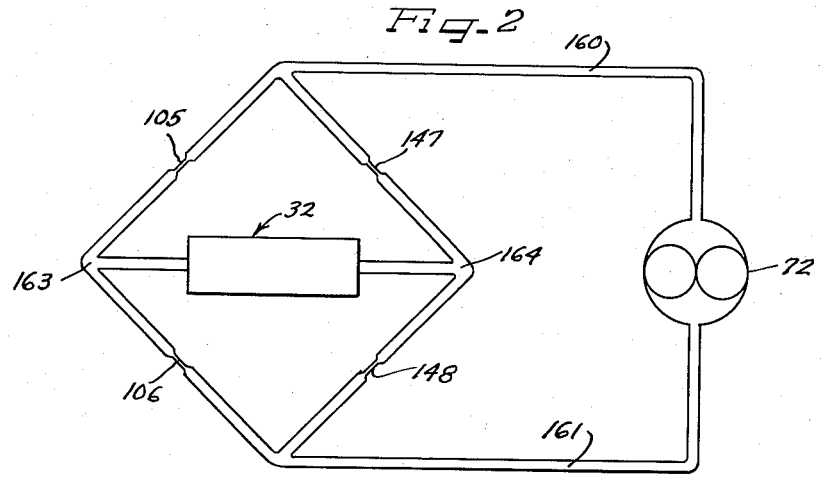
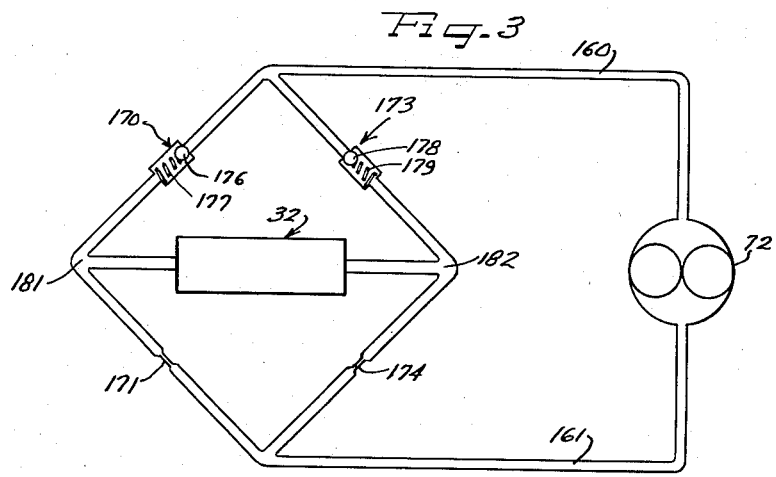
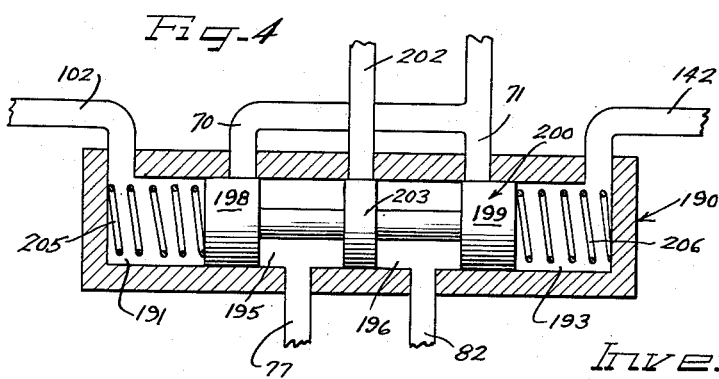

United States Patent Office 2,974,639
Patented Mar. 14, 1961

2,974,639

HYDRAULIC BRIDGE SERVO CONTROL SYSTEM

Bernard E. O'Connor, Los Angeles, Calif., and Gordon E. Whelpley, Corning, N.Y., assignors to Houdaille Industries, Inc., Buffalo, N.Y., a corporation of Michigan Filed Oct. 3, 1956, Ser. No. 613,669

2 Claims. (Cl. 121—41)

This invention relates to a control system for controlling movement of various components such as the nose wheel or ailerons of aircraft.

It is an important object of the present invention to provide a novel bridge type hydraulic control circuit for aircraft and the like.

It is a further object of the invention to provide control by fluid pressure means of the direction and rate of movement of fluid pressure operated units of an aircraft or the like.

It is another important object of the invention to provide a control system which functions substantially independently of input and output pressures and/or flow rates.

Another object of the invention resides in the provision of a control system utilizing fluid pressure to couple a control in the cockpit of an aircraft or the like to an actuator at a remote position.

Still another object of the invention resides in the provision of a combined actuating and damping system for aircraft and the like.

Other and further important objects, features and advantages of the invention will be apparent from the following detailed description taken in connection with the accompanying drawings, in which:

Figure 2 is a diagrammatic representation of the control circuit of Figure 1;

Figure 3 is a diagrammatic illustration of a modified control circuit for the system of Figure 1; and Figure 4 is a schematic illustration of a modified balance valve for the system of Figure 1.

As shown on the drawings:

Figure 1:
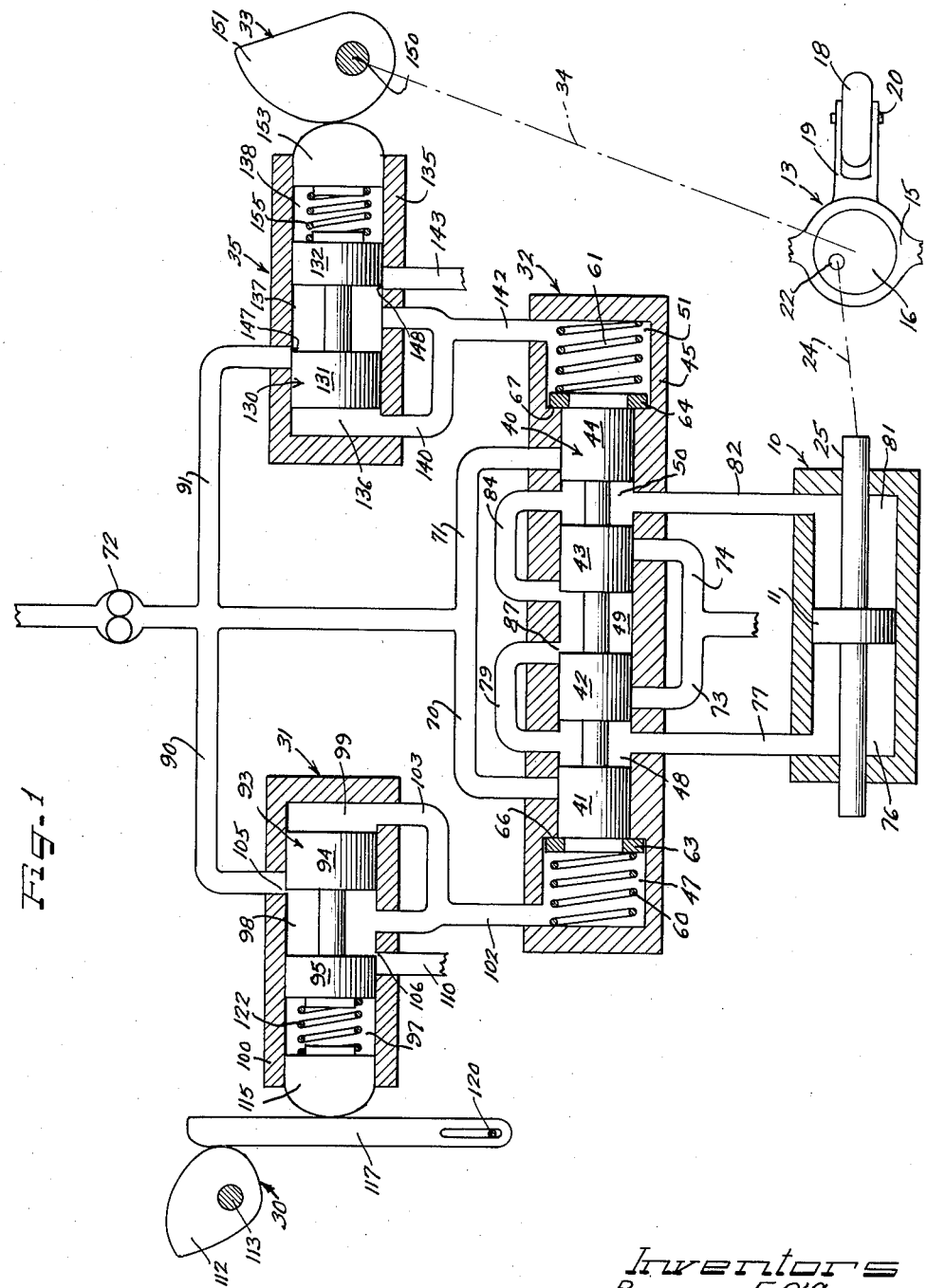
Figure 1 is a diagrammatic illustration of a hydraulic control system in accordance with the present invention.

The present invention relates to a control system for controlling movement of various components of aircraft and the like such as the nose wheel or ailerons. By way of example, in Figure 1, a hydraulic actuator 10 is illustrated as having a piston 11 coupled to a nose wheel assembly 13 of an aircraft. The nose wheel assembly is illustrated diagrammatically as comprising a support structure 15 having a wheel shaft 16 rotatably carried thereby and connected with a nose wheel 18. For example, the nose wheel 18 may be mounted on a fork member 19 by means of a horizontal axle 20, and the fork 19 may be pivotally connected to the wheel shaft 16. Suitable shock absorber means may be interposed between the wheel shaft 16 and the fork 19 to control vertical movement of the fork 19 about its horizontal pivot with the shaft 16. The wheel shaft 16 is illustrated as carrying a pin 22 at a radial distance from the central axis thereof which is coupled by suitable linkage means indicated by the dash line 24 to piston rod 25 of piston 11. The hydraulic actuator 10 may be mounted with the support structure 15 for oscillating movement on a vertical axis to accommodate the rotary movement of the pin 22 about the vertical axis of the wheel shaft 16.

For controlling movement of the wheel assembly 13 of the aircraft, the system of Figure 1 is provided with an input mechanism 30 which may for example be coupled to the rudder bar of the aircraft when it is desired to steer the wheel 18. The input mechanism 30 controls the condition of an input regulating valve assembly 31. The regulating valve assembly 31 in turn controls a balance valve assembly 32 which will then actuate the output mechanism 10 in accordance with the input introduced at 30. An output mechanism 33 is coupled to the output device 10 as indicated by the dash line 34 so that the mechanism 33 indicates at each instant of time the actual condition of the output which is then compared with the input at 30 by the balance valve 32. The output indicator 33 controls an output regulating valve assembly 35 and when the input 30 and output 33 correspond, the balance valve 32 returns to a neutral position to deactuate the output device 10.

Referring to the embodiment of Figure 1 in greater detail the balance valve 32 has an axially shiftable valve member 40 with spool portions 41, 42, 43 and 44 defining with the valve body 45 internal chambers 47, 48, 49, 50 and 51. The valve member 40 is normally maintained in a central position by means of springs 60 and 61 in chambers 47 and 51 which act on rings 63 and 64 interposed between the springs and the valve member 40 at the respective opposite ends of valve member. In center position of the valve member 40, the rings 63 and 64 abut against shoulders 66 and 67 of the valve body so that the valve member 40 is precisely centered even though the springs 60 and 61 may not be precisely balanced. In central position of the valve member 40, input lines 70 and 71 from pump 72 are shut off by spools 41 and 44 of the valve member 40, while return lines 73 and 74 are shut off by spool portions 42 and 43 of the valve member 40. Working chamber 76 of the output device 10 is connected with chamber 48 of the balance valve 32 by means of a hydraulic line 77. Chamber 48 is connected to chamber 49 by means of a line 79. Similarly work chamber 81 of the output device 10 is connected by a line 82 to chamber 50 of the balance valve, and chamber 50 is connected to the chamber 49 by means of a line 84. Thus the two working chambers of the output device 10 are interconnected in neutral position of the valve member 40. Interchange of fluid between the working chambers as the piston 11 is reciprocated may be suitably damped by means of orifices such as indicated at 87 defined by the spool portion 42 at the entrance of the line 79 to the chamber 49. By the provision of a suitable damping orifice such as 87, oscillation of the wheel assembly 13 may be damped while the valve member 40 is in its central position.

As illustrated in Figure 1, the same pump 72 may have its output referenced to the regulating valves 31 and 35 by means of lines 90 and 91. The valve 31 has an axially shiftable valve member 93 with spool portions 94 and 95 defining chambers 97, 98 and 99 within valve casing 100. The pressure in chamber 98 of the valve 31 is referenced to chamber 47 of the balance valve 32 by means of a line 102 and is referenced to chamber 99 by means of a line 103. The spool portion 94 defines a pressure control orifice 105 while the spool portion 95 defines a pressure control orifice 106 so that shifting of the valve member 93 effectively varies the pressure in the central chamber 98 and thus in the balance chamber 47 of the balance valve 32. Line 110 downstream of the orifice 106 may connect to the upstream side of the pump 72.

For controlling the position of the valve member 93 in accordance with the pilot's rudder bar, the input mechanism 30 comprises a cam member 112 mounted on a shaft 113 coupled to the pilot's rudder bar for movement with the rudder bar in any desired ratio. Movement of the cam 112 is transmitted to a plunger member 115 by means of a lever 117 which is pivotally carried on a shaft 120. The plunger 115 is thus positioned in accordance with the position of the pilot's rudder bar to control the force exerted on valve member 93 by spring 122 which is interposed between the plunger 115 and the valve member 93 in chamber 97.

The output regulating valve 35 is similar to the input valve 31 and comprises a valve member 130 having spool portions 131 and 132 dividing the interior of the valve body 135 into chambers 136, 137 and 138. Chambers 136 and 137 are interconnected by line 140, and chamber 137 is referenced to balance chamber 51 by means of line 142. Line 143 may lead from the chamber 137 to the intake of pump 72. Spool portion 131 defines a pressure control orifice 147 with inlet line 91 while spool portion 132 defines a pressure control orifice 148 at return line 143 so that shifting of the valve member 130 varies the pressure in chamber 137. The output position indicator 33 comprises a shaft 150 coupled to the wheel shaft 16 in any suitable ratio by means of the mechanism indicated at 34 and has a cam 151 fixed thereto for operating a plunger 153. The plunger 153 acts against a spring 155 to control the force exerted by the spring against the valve member 130. Both spring 122 of the input regulating valve 31 and spring 155 of the output regulating valve 35 are compression springs which act against the pressure in chambers 99 and 136 respectively.

In operation of the system of Figure 1, if the angular position of the output cam 151 corresponds to the angular position of the input cam 112, the pressure in chambers 98 and 137 of the regulating valves will be substantially equal so that the pressure in the balance chambers 47 and 51 of balance valve 32 will likewise be equal and the valve member 40 will be in its central position. Under these circumstances, any axial movement of the piston rod 25 will be damped by means of the damping orifice 87.

If the pilot introduces a steering signal in the form of rotation of the input cam 112, for example in the clockwise direction, this will produce an increase in pressure in the chamber 98 to cause the valve member 40 to shift to the right, with spool portion 42 closing off the line 79 and spool portion 44 uncovering the line 71 and spool portion 42 uncovering the line 73 so that pressure will be supplied from the pump 72 through the line 71, the chamber 50, and line 82 to the working chamber 81 to cause the piston 11 to move to the left, fluid being exhausted from the working chamber 76 through the line 77, chamber 48 and return line 73. As the piston 11 moves to the left, due to the mechanical coupling through 24 and 34, the shaft 150 will rotate in correspondence to rotate the cam 151 in the counterclockwise direction. When the cam 151 again angularly corresponds with the input cam 112, the pressure in chamber 137 will again equal the pressure in chamber 98, and the valve member 40 will be returned to central position to deactuate the output device 10 which is then returned to its damping mode.

If the input cam 112 is then rotated in the counterclockwise direction by the pilot, this will cause a decrease in pressure in the chamber 98 of regulating valve 31 and a corresponding decrease in pressure in the balance chamber 47 of balance valve 32 to cause the valve member 40 to be moved to the left with spool portion 43 closing line 84 and opening return line 74 to chamber 50. Spool 41 uncovers inlet line 70 so that inlet pressure is then supplied from pump 72 through line 70, chamber 48 and line 77 to working chamber 76 to shift the piston 11 to the right with fluid flowing from the working chamber 81 through line 82, chamber 50 and return line 74 to the intake of pump 72. As previously, movement of the piston 11 causes corresponding movement of the output cam 151 now in the clockwise direction to correspondingly reduce the pressure in chamber 137 until the valve member 40 returns to central position and deactuates the output device 10.

Figure 2 illustrates diagrammatically the regulating system of Figure 1 and illustrates the manner in which this system is analogous to a Wheatstone bridge circuit. Corresponding reference numerals have been given to corresponding parts in Figures 1 and 2. In Figure 2, it will be observed that the pump 72 supplies pressure through line 160 to variable orifices 105 and 106 in series and 147 and 148 in series to return line 161. If orifices 105 and 106 are varied by enlarging orifice 105 and restricting orifice 106, a pressure differential will exist across balance valve 32 due to the increase in pressure at 163 in Figure 2 as compared to the pressure at 164. If orifice 147 is enlarged and orifice 148 is restricted, a point will be reached where the pressure at 164 is equal to the pressure at 163.

In the modification of Figure 3, the arrangement of parts is similar to that illustrated in Figure 2, and the pump 72 and balance valve member 32 may correspond to those shown in Figure 1. However in Figure 3, the input regulating valve corresponding to valve 31 in Figure 1 is illustrated as comprising a spring urged pressure regulating valve 170 in series with a fixed orifice 171 while the output regulating valve corresponding to valve 35 in Figure 1 is represented as comprising a spring urged pressure regulating valve 173 in series with a fixed orifice 174. The regulating valve 170 comprises a valve member 176 which is urged against its seat by means of a spring 177. Similarly the regulating valve 173 may comprise a valve member 178 and a spring 179. In a physical embodiment of the system of Figure 3, the input spring 177 and the output spring 179 may have their force on the valve members 176 and 178 varied by means of shiftable plungers corresponding to the plungers 115 and 153 as shown in Figure 1, and the plungers would correspondingly be coupled to input and output cams in the manner illustrated in Figure 1.

Thus in the operation of the embodiment of Figure 3, if an input cam corresponding to 112 in Figure 1 is rotated in a clockwise direction, the force exerted by spring 177 in the seating direction on valve member 176 would be increased to reduce the pressure at point 181, causing the balance valve member corresponding to the valve member 40 in Figure 1 to shift to the left and causing the output device corresponding to the output piston 11 in Figure 1 to shift to the right to rotate the output cam corresponding to cam 151 in Figure 1 counterclockwise and thus to increase the force exerted by spring 179 in Figure 3 against valve member 178 until the pressure at point 182 is reduced to a value equal to the pressure at 181. In Figure 3, it will be understood that the balance valve 32 may be identical to that illustrated in Figure 1 and may be provided with input lines 70 and 71, return lines 73 and 74 and damping lines 77, 79, 84 and 82 in the same manner as in Figure 1. Point 181 in Figure 3 would be referenced to the chamber 47 of balance valve 32 and point 182 would be referenced to the balance chamber 51 of balance valve 32.

In Figure 4, there is illustrated a modified balance valve assembly 190 which may be substituted directly into the system of Figure 1. It will be observed that the left hand balance chamber 191 of the valve 190 may be referenced to the chamber 98 of the input regulating valve 31 of Figure 1 by means of a conduit 102 corresponding to the conduit 102 in Figure 1. Similarly the right hand balance chamber 193 is referenced to the chamber 137 of the output regulating valve 35 in Figure 1 by means of a conduit 142 corresponding to the line 142 in Figure 1. Chambers 195 and 196 of balance valve 190 connect with working chambers 76 and 81 in Figure 1 by means of lines 77 and 82, and spool portions 198 and 199 of valve member 200 block off inlet lines 70 and 71 corresponding to lines 70 and 71 in Figure 1 connected to the output of pump 72. Return line 202 in Figure 4 is blocked off in neutral position of valve member 200 by means of spool portion 203, and this return line 202 would connect to the inlet side of pump 72 in Figure 1. In the valve member of Figure 4, it will be observed that there is no damping orifice in central position of the valve member 200 so that the output device controlled by the balance valve 190 would be locked in a fixed position when the valve member 200 is centered. It will also be observed in Figure 4, that the valve member 200 has opposed balance springs 205 and 206 tending to center the valve member 200 in the position shown in Figure 4. However, rings such as shown in 63 and 64 in Figure 1 are omitted, so that the valve member will respond to slight differentials in pressure between the chambers 191 and 193. In Figure 1, the springs 60 and 61 may be under considerable tension with the valve member 40 in the centered position shown, so that a considerable differential in pressure may be required before the valve member 40 will move off its centered position.

In operation of the embodiment of Figure 4, a clockwise movement of the input cam will cause an increase in pressure in balance chamber 191 to shift the valve member 200 to the right and supply pressure to the working chamber 81 to shift the piston 11 to the left. This produces corresponding counterclockwise movement of the cam 151 to correspondingly increase the pressure in chamber 193 until a point is reached where the valve member 200 is returned to its center position locking the output piston 11 in its new position. It will be understood that the balance valve 190 may be substituted for the valve 32 in Figures 2 and 3.

In the embodiments of Figures 1 through 4, it will be apparent that the input control mechanism 30 and the input regulating valve 31 or 170 may be positioned in the cockpit of the aircraft while the balance valve assembly 32 or 190 advantageously may be carried with the support structure 15. The output sensing mechanism 33 and output regulating valve 35 or 173 as well as the output device 10 may be carried with the support structure 15 of the aircraft.

It will be apparent that many modifications and variations may be effected without departing from the scope of the novel concepts of the present invention.

We claim as our invention:

1. A hydraulic control system comprising a hydraulic circuit for circulating a liquid medium including an input hydraulic conduit having first and second flow restriction means in series and an output hydraulic conduit having first and second flow restriction means in series therein, means for delivering a liquid medium under pressure to said input and output hydraulic conduits in parallel, balance valve means having respective balance chambers referenced to said inlet and outlet hydraulic conduits at respective reference chambers intermediate the first and second flow restriction means therein, means for controlling the liquid pressure in said input hydraulic conduit between the first and second flow restriction means therein in accordance with an input variable, means for controlling the liquid pressure in said output hydraulic conduit between said first and second flow restriction means therein in accordance with an output variable, means comprising said balance valve means for controlling said output variable in accordance with the liquid pressure differential between said balance chambers and in a direction to tend to equalize the pressures in said balance chambers, means whereby said valve member causes the supply of liquid pressure to one hydraulic working chamber when the valve member is shifted in one direction and to the opposite hydraulic working chamber when the valve member is shifted in the opposite direction, and said first and second flow restriction means of said input hydraulic conduit and of said output hydraulic conduit each comprising respective first and second variable orifice valve means, and means rigidly coupling said first and second variable orifice valve means upstream and downstream of the reference chamber of said input hydraulic circuit and upstream and downstream of the reference chamber of said output hydraulic circuit for conjoint movement to continuously vary the hydraulic pressure in said reference chambers in accordance with the input variable and in accordance with the output variable, respectively, there being a plurality of positions of said first and second variable orifice valve means of said input hydraulic conduit and of said output hydraulic conduit where the first and second variable orifice valve means are both open to liquid flow therethrough.

2. A hydraulic control system comprising a hydraulic circuit for circulating a liquid medium including an input hydraulic conduit having first and second flow restriction means in series and an output hydraulic conduit having first and second flow restriction means in series therein, means for delivering a liquid medium under pressure to said input and output hydraulic conduits in parallel, balance valve means having respective balance chambers referenced to said inlet and outlet hydraulic conduits at respective reference chambers intermediate the first and second flow restriction means therein, means for controlling the liquid pressure in said input hydraulic conduit between the first and second flow restriction means therein in accordance with an input variable, means for controlling the liquid pressure in said output hydraulic conduit between said first and second flow restriction means therein in accordance with an output variable, means comprising said balance valve means for controlling said output variable in accordance with the liquid pressure differential between said balance chambers and in a direction to tend to equalize the pressures in said balance chambers, means whereby said valve member causes the supply of liquid pressure to one hydraulic working chamber when the valve member is shifted in one direction and to the opposite hydraulic working chamber when the valve member is shifted in the opposite direction, and said first and second flow restriction means of said input hydraulic conduit and of said output hydraulic conduit each comprising respective first and second variable orifice valve means, and means rigidly coupling said first and second variable orifice valve means upstream and downstream of the reference chamber of said input hydraulic circuit and upstream and downstream of the reference chamber of said output hydraulic circuit for conjoint movement to continuously vary the hydraulic pressure in said reference chambers in accordance with the input variable and in accordance with the output variable, respectively, there being a plurality of positions of said first and second variable orifice valve means of said input hydraulic conduit and of said output hydraulic conduit where the first and second variable orifice valve means are both open to liquid flow therethrough, said first and second variable orifice valve means comprising a valve casing having an axially shiftable valve member therein with a pair of spool portions rigidly connected for joint movement, one of said spool portions cooperating with a port in said valve casing to define said first flow restriction means and the other of said spool portions cooperating with a second port in said valve casing to define said second flow restriction means, the spool portions defining therebetween said reference chamber, means defining a chamber in said valve casing acting on the outer side of the first of said spool portions and referenced to the reference chamber to tend to restrict said first variable orifice valve means and to open said second variable orifice valve means, and spring means acting on the outer side of the other spool portion in accordance with the input variable or output variable for controlling the liquid pressure in said reference chamber.

(References on following page)

References Cited in the file of this patent

UNITED STATES PATENTS

| | | |
|---|---|---|
| 2,124,946 | Harrison | July 26, 1938 |
| 2,177,098 | Doe | Oct. 24, 1939 |
| 2,484,557 | Eckman | Oct. 11, 1949 |
| 2,503,397 | Valley | Apr. 11, 1950 |
| 2,750,862 | Garmager | June 19, 1956 |
| 2,775,254 | Stanbury | Dec. 25, 1956 |

FOREIGN PATENTS

| | | |
|---|---|---|
| 459,893 | Great Britain | Jan. 18, 1937 |
| 982,403 | France | Jan. 31, 1951 |